United States Patent [19]

Saito et al.

[11] Patent Number: 4,737,313
[45] Date of Patent: Apr. 12, 1988

[54] LIQUID-CRYSTALLINE SUBSTITUTED BIPHENYL ESTERS

[75] Inventors: Shinichi Saito; Hiromichi Inoue; Kanetsugu Terashima; Takashi Inukai, all of Yokohamashi; Kenji Furukawa, Yokosukashi, all of Japan

[73] Assignee: Chisso Corporation, Osaka, Japan

[21] Appl. No.: 893,462

[22] Filed: Aug. 8, 1986

Related U.S. Application Data

[63] Continuation-in-part of Ser. No. 692,165, Jan. 17, 1985, abandoned.

[30] Foreign Application Priority Data

Feb. 8, 1984 [JP] Japan .................. 59-21439

[51] Int. Cl.$^4$ ............ C09K 19/30; C09K 19/12; C07C 69/76; C07C 69/74
[52] U.S. Cl. ............. 252/299.63; 252/299.65; 350/350.5; 558/414; 558/416; 558/273; 558/275; 560/1; 560/66; 560/73; 560/108; 560/51; 560/86
[58] Field of Search ............ 252/299.63, 299.65; 350/350.5; 558/411, 414, 273, 416; 560/1, 66, 73, 108, 51, 86

[56] References Cited

U.S. PATENT DOCUMENTS

| | | | |
|---|---|---|---|
| 4,029,594 | 6/1977 | Gavrilovic et al. | 252/299.65 |
| 4,073,742 | 2/1978 | Erdmann et al. | 252/299.67 |
| 4,216,109 | 8/1980 | Mizukuchi | 252/299.67 |
| 4,368,135 | 1/1983 | Osman | 252/299.63 |
| 4,400,293 | 8/1983 | Romer et al. | 252/299.63 |
| 4,505,838 | 3/1985 | Romer et al. | 252/299.66 |
| 4,589,996 | 5/1986 | Inoue et al. | 252/299.65 |
| 4,596,667 | 6/1986 | Inukai et al. | 252/299.65 |
| 4,613,209 | 9/1986 | Goodby et al. | 350/350.5 |
| 4,614,609 | 9/1986 | Inoue et al. | 252/299.66 |
| 4,622,165 | 11/1986 | Kano et al. | 252/299.65 |
| 4,689,176 | 8/1987 | Inoue et al. | 252/299.65 |

FOREIGN PATENT DOCUMENTS

| | | | |
|---|---|---|---|
| 19665 | 12/1980 | European Pat. Off. | 252/299.63 |
| 115693 | 8/1984 | European Pat. Off. | 252/299.65 |
| 191600 | 8/1986 | European Pat. Off. | 252/299.65 |
| 55-29545 | 3/1980 | Japan | 252/299.65 |
| 55-81849 | 6/1980 | Japan | 252/299.65 |
| 57-77644 | 5/1982 | Japan | 252/299.63 |

OTHER PUBLICATIONS

Goodby et al, Liquid Crystals Ordered Fluids, 1984, vol. 4, pp. 1-32, from Proceedings of ACS Symposium in USA 1982.
Gray et al, MCLC, 1976, vol. 37, pp. 157-188.

Primary Examiner—Teddy S. Gron
Assistant Examiner—J. E. Thomas
Attorney, Agent, or Firm—Wenderoth, Lind & Ponack

[57] ABSTRACT

Novel ferroelectric liquid crystals exhibiting a chiral smectic C phase and liquid crystal compositions containing the same are provided, which liquid crystals are substituted biphenyl esters expressed by the general formula

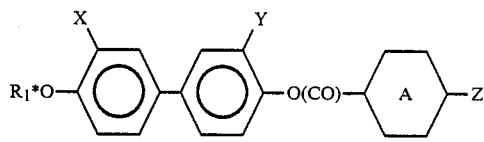

wherein $R_1^*$ represents an optically active alkyl group of 4 to 18 carbon atoms;

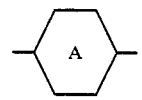

represents

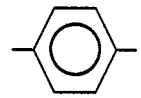

or

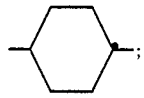

Z represents $R_2$, $R_2CO$ or $R_2COO$ wherein $R_2$ represents an alkyl group or an alkoxy group each of 1 to 18 carbon atoms; and X and Y each represent hydrogen atom (H), bromine atom (Br), chlorine atom (Cl), fluorine atom (F) or cyano group (CN), and either one of X or Y is always hydrogen atom.

8 Claims, No Drawings

LIQUID-CRYSTALLINE SUBSTITUTED BIPHENYL ESTERS

This application is a continuation-in-part application of application Ser. No. 692,165, filed Jan. 17, 1985 and abandoned concurrently with the filing of this application.

BACKGROUND OF THE INVENTION

1. Field of the Invention

This invention relates to novel liquid-crystalline substances and liquid crystal compositions containing the same, and more particularly it relates to chiral liquid-crystalline substances having an optically active alkyl group and chiral liquid crystal compositions containing the same.

2. Description of the Prior Art

For liquid crystal display elements, the TN (Twisted Nematic) type display mode has currently been most widely employed. This mode, however, has a drawback that the response rate is late. In this respect, various improvements have been attempted, but a possibility of its improvement to a large extent does not appear to be expected so much. As one of the substitutive modes therefor, there is a mode utilizing a ferroelectric liquid crystal (N. A. Clark et al: Applied Phys. lett., 36, 899 (1980)). This mode utilizes the chiral smectic C phase (hereinafter abbreviated to SC* phase) or the chiral smectic H phase (SH* phase) of ferroelectric liquid crystals, and those having these phases in the vicinity of room temperature are preferable. Certain compounds used for such a purpose have been known, but there is a practical problem in respect of safety, etc. Mainly in order to develop liquid crystal substances suitable to be utilized for this display mode, the present inventors have made extensive research for liquid crystal substances containing an optically active group.

SUMMARY OF THE INVENTION

The present invention resides in substituted biphenyl esters expressed by the general formula

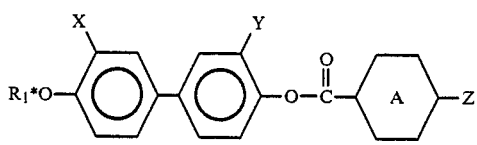

wherein $R_1^*$ represents an optically active alkyl group of 4 to 18 carbon atoms;

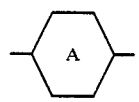

represents

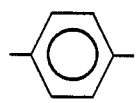

or

Z represents $R_2$, $R_2CO$ or $R_2COO$ wherein $R_2$ represents an alkyl group or an alkoxy group each of 1 to 18 carbon atoms; and X and Y each represent a hydrogen atom (H), a bromine atom (Br), a chlorine atom (Cl), a fluorine atom (F) or a cyano group (CN), and either one of X or Y is always a hydrogen atom, and chiral smectic liquid crystal compositions containing at least one kind of the above substituted biphenyl esters.

DETAILED DESCRIPTION OF THE PREFERRED EMBODIMENTS

Certain compounds of the formula (I) exhibit cholesteric phase (Ch phase) or smectic phase (SA phase) at somewhat lower temperatures than those of isotropic liquid phase (I phase), and more compounds of the formula (I) exhibit SC* phase at somewhat lower temperatures than those of the above phases. Display elements are constituted utilizing the ferroelectric property of the SC* phase, and when liquid crystal compositions having SC* phase, used therefor, are prepared, it is possible to constitute the compositions using only a plurality of the compounds of the formula (I), and it is also possible to prepare liquid crystal compositions exhibiting SC* phase by mixing the compounds of the formula (I) with other smectic liquid crystals.

When the light-switching effect of SC* phase is applied to display elements, there are three superior specific features as compared with TN display mode. The first specific feature is that the response is made at a very high rate and the response time is 1/100 or shorter than that of the elements of usual TN display mode. The second specific feature is that there is a memory effect and the multiplex drive is easy in cooperation with the above high rate response property. The third specific feature is that when the gray scale is made according to TN display mode, this is carried out by adjusting the impressed voltage, but there are difficult problems such as temperature-dependency of the threshold voltage, voltage-dependency of the response rate, etc.; whereas when the light-switching effect of SC* phase is applied, it is possible to easily obtain the scale by adjusting the reverse time of the polarity; hence the above application is very suitable to graphic displays.

As for the display method, the following two modes may be considered: one, a birefringence type using two polarizers and the other, a guest-host type using a dichroic dyestuff. SC* phase has a spontaneous polarization; hence when the polarity of the impressed voltage is reversed, the molecule reverses around its helical axis as a rotating axis. When a iquid crystal composition having SC* phase is filled in a liquid crystal display cell and subjected to an aligning treatment so that liquid crystal molecules may align in parallel to the electrode surfaces; the liquid crystal cell is placed between two polarizers arranged so that the director of the liquid crystal molecules may be in parallel to the other polarization plane; a voltage is impressed; and the polarity is reversed, then it is possible to obtain a bright visual field and a dark one (determined by the opposed angle of the polarizers). On the other hand, when the cell is operated using the guest-host type, it is possible to obtain a bright visual field and a dark one (determined by the arrangement of the polarization plate), by reversing the polarity of the impressed voltage.

In general, it is difficult to align liquid crystal molecules in smectic state in parallel to the glass wall surface; hence liquid crystal molecules have so far been aligned by very slowly cooling its isotropic liquid in a magnetic field of several tens kilogausses or more (1° C.~2° C./hr). Whereas, in the case of liquid crystal substances having cholesteric phase, it is possible to easily obtain a uniformly aligned monodomain state, by cooling the substances at a cooling rate of 1° C./min. while impressing a direct current voltage of 50 V~100 V in place of the magnetic field.

Further, since compounds of the fomula (I) have an optically active carbon atom, they, when added to nematic liquid crystals, have a performance of inducing a twisted structure therein. Nematic liquid crystals having a twisted structure i.e. chiral nematic liquid crystals, do not form the so-called reverse domain of TN type display elements; hence it is possible to use compounds of the formula (I) as an agent for preventing the reverse domain from forming.

Further, racemic form compounds corresponding to the compounds of the formula (I) can be used for extending the pitch of SC* compounds.

As for $R_1^*$ in the formula (I), compounds having the 2-methylbutyl group are most practical since their raw materials are easily commercially available. Next to compounds having the above group, those having the 2-octyl group are easily commercially available.

Other optically active 2-alkanols, i.e., (+)2-butanol, (+)2-pentanol, (+)2-hexanol, are also commercially available, though much more expensive. Optically active 2-alkanols up to 2-tridecanol can be obtained by resolution of racemic 2-alkanols by the method of R. H. Pickard et al. (J. Chem. Soc., 99, 45 (1911)). The lipase-catalyzed stereospecific transesterification method by B. Cambou et al. (J. Amer. Chem. Soc., 106, 2687 (1984)), allows us to obtain both the R and S isomers of 2-alkanols. By using these optically active 2-alkanols as the starting material, a variety of compounds of formula (I) in which $R_1^*$ is 1-methylalkyl group may be obtained, in an analogous way to that which will be shown for the case of $R_1^* = $ 1-methylheptyl.

The merit of using an optically active 1-methylalkyl group for $R_1^*$, instead of cheaper 2-methylbutyl, rests on the fact that much higher spontaneous polarization ($P_s$) is thereby achieved. For example, the compounds Nos. 37 and 38 show $P_s$ of 63 nC/cm², and 66 nC/cm², respectively, in sharp contrast to the 2-methylbutyl compounds which show about 2 to 3 nC/cm², as shown later (in Use examples 2 and 3).

Next, preparation of compounds of the formula (I) will be described. Basically it is possible to obtain the compounds by subjecting an optically active 4'-alkoxy-3'(or 3)-substituted-4-hydroxybiphenyl and a 4-substituted benzoic acid halide to esterification. Examples of the hydroxybiphenyls as one of the raw materials are 3'-bromo-4'-alkyloxy-4-hydroxybiphenyls, 3'-chloro-4'-alkyloxy-4-hydroxybiphenyls, 3'-fluoro-4'-alkyloxy-4-hydroxybiphenyls, 3'-cyano-4'-alkyloxy-4-hydroxybiphenyls, 4'-alkyloxy-3-bromo-4-hydroxybiphenyls, 4'-alkyloxy-3-chloro-4-hydroxybiphenyls, 4'-alkyloxy-3-fluoro-4-hydroxybiphenyls, and 4'-alkyloxy-3-cyano-4-hydroxybiphenyls. Any of these may be prepared by reacting an optically active brominated alkyl with p,p'-biphenol as a starting raw material to obtain a 4'-alkyloxy-4-hydroxybiphenyl which is then subjected to halogenation, etc. 4-Alkoxy-3'(or 3)-fluoro-4-hydroxybiphenyls are more conveniently prepared through other synthetic routes. The details will be described in Examples below.

Further, examples of 4-substituted benzoic acid halides as the other of the esterification raw materials are p-alkylbenzoyl halides, p-alkanoyloxybenzoyl halides, p-alkyloxybenzoyl halides, p-alkyloxycarbonyloxybenzoyl halides, p-alkylcarbonylbenzoyl halides, p-alkyloxycarbonylbenzoyl halides, and p-alkyl-trans-cyclohexylcarbonyl halides.

The liquid crystal compounds and liquid crystal compositions of the present invention will be described below in more detail by way of Examples.

EXAMPLE 1

Preparation of
3'-bromo-4'-(2-methylbutyloxy)-4-biphenylyl-4-octyloxybenzoate (a compound of the formula (I) wherein $R_1^*$ represents the 2-methylbutyl group; Z is octyloxy group;

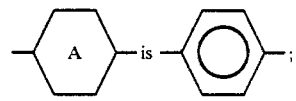

X is Br; and Y is H)

(i) Preparation of
4'-(2-methylbutyloxy)-4-hydroxybiphenyl

A mixture of 4,4'-dihydroxybiphenyl (500 g), ethanol (7.5 l) and KOH (302 g) was heated under reflux with stirring, followed by dropwise adding (+) brominated 2-methylbutyl (prepared from (−) 2-methylbutanol with phosphorus bromide) (530 g), reacting the mixture for 4 hours, distilling off ethanol, adding water (2 l), filtering, collecting insolubles, and treating the insolubles with toluene to remove solubles. This soluble part was recrystallized from ethanol to obtain scaly crystals having a melting point of 80.5° C.; thus it was confirmed to be di-(2-methylbutyloxy)biphenyl. On the other hand, the insoluble part was heated with hydrochloric acid with stirring, followed by cooling, collecting solids and recrystallizing from toluene and further from ethanol to obtain 4'-(2-methylbutyloxy)-4-hydroxybiphenyl having a m.p. of 137.5° C. (125 g).

(ii) Preparation of
4'-(2-methylbutyloxy)-4-p-toluenesulfonyloxy-biphenyl

4'-(2-Methylbutyloxy)-4-hydroxybiphenyl (30 g) prepared in the above step (i) was dissolved in pyridine (150 ml) dried with KOH. Into the resulting solution was poured a solution of commercially available p-toluenesulfonyl chloride (35 g) dissolved on heating in toluene (150 ml) dried by a molecular sieve, followed by heating with stirring for 4 hours, adding ice and 6N hydrochloric acid for acidification, separating the liquid layer, washing with water, further washing with an aqueous solution of 2N NaOH, washing with water, distilling off toluene, and recrystallizing the residue from ethanol to obtain 4-(2-methylbutyloxy)-4'-p-toluenesulfonyloxy-biphenyl (44.5 g). M.p.: 94°~97° C.

(iii) Preparation of 3'-bromo-4'-(2-methylbutyloxy)-4-p-toluenesulfonyl-biphenyl 4'-(2-methylbutyloxy)-4-p-toluenesulfonylbiphenyl (41 g) prepared in the above step (ii) was dissolved in CCl₄ (400 ml). To the resulting solution was dropwise added bromine (25 g) dissolved in CCl₄ (100 ml), at room temperature over one hour, followed by stirring at room temperature for 5 hours, adding an aqueous solution of sodium hydrogen sulfite till the color of bromine disappeared, separating the organic layer, washing with 6N hydrochloric acid, washing with an aqueous solution of 2N NaOH, washing with water to make the solution neutral, drying and distilling off CCl₄ to obtain oily 3'-bromo-4'-(2-methylbutyloxy)-4-p-toluenesulfonylbiphenyl (55.7 g).

This product was used in the following reaction without any particular purification.

(iv) Preparation of 3'-bromo-4'-(2-methylbutyloxy)-4-biphenylylbenzoate

A mixture of 3'-bromo-4'-(2-methylbutyloxy)-4-p-toluenesulfonylbiphenyl (40 g) prepared in the above step (iii), a 50% aqueous solution (20 g) of NaOH and ethanol (350 ml) was heated under reflux for 4 hours, followed by distilling off ethanol, adding toluene, further adding 6N hydrochloric acid, separating the resulting liquid layer, washing with water to make the solution neutral, drying and distilling off toluene to obtain a raw product of oily 3'-bromo-4'-(2-methylbutyloxy)-4-hydroxybiphenyl, which was then dissolved in pyridine (200 ml), followed by adding benzoyl chloride (20 g), heating the mixture on a water bath, allowing to stand overnight, adding toluene, washing with 6N hydrochloric acid, washing with water, further washing with an aqueous solution of 2N NaOH, washing with water to make the solution neutral, drying and distilling off toluene to obtain 3'-bromo-4'-(2-methylbutyloxy)-4-biphenylylbenzoate (25 g). M.p.: 93.6° C.

(v) Preparation of 3'-bromo-4'-(2-methylbutyloxy)-4-hydroxybiphenylyl

A mixture of 3'-bromo-4'-(2-methylbutyloxy)-4-biphenylylbenzoate (4.8 g) from step (IV), a 40% aqueous solution (3.2 g) of NaOH and ethanol (100 ml) was heated under reflux for 3 hours, followed by distilling off ethanol, adding toluene, acidifying with 6N hydrochloric acid, heating to dissolve insolubles, separating the solution layer, washing with water, further washing with an aqueous solution of sodium hydrogen sulfite, washing with water to make the solution neutral, drying, distilling off toluene and recrystallizing the residue from n-heptane to obtain 3'-bromo-4'-(2-methylbutyloxy)-4-hydroxybiphenyl (3.0 g). M.p.: 75°~76.5° C.

(vi) Preparation of the captioned compound, 3'-bromo-4'-(2-methylbutyloxy)-4-biphenylyl-4-octyloxybenzoate 3'-Bromo-4'-(2-methylbutyloxy)-4-hydroxybiphenyl (0.5 g) prepared in the above step (v) was dissolved in pyridine (10 ml), followed by dropwise adding of p-octyloxybenzoyl chloride (0.4 g) to the solution under ice cooling, allowing the mixture to stand on a water bath overnight, then adding toluene (80 ml), washing with 6N hydrochloric acid, washing with water, further washing with an aqueous solution of 2N NaOH, washing with water to make the solution neutral, drying, distilling off toluene and twice recrystallizing the residue from ethanol (50 ml) to obtain 3'-bromo-4'-(2-methylbutyloxy)-4-biphenyl-4-octyloxybenzoate (0.3 g). Its phase transition points are shown in Table 1 together with those of other compounds. Further, its chemical structure was confirmed by NMR.

TABLE 1

| | in Formula (I)[1] | | | | Phase transition point (°C.)[2] | | | | |
| Example | X | Y | A | Z | C | SC* | SA | Ch | I |
|---|---|---|---|---|---|---|---|---|---|
| 5 | Br | H | 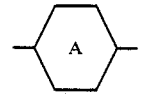 | $C_4H_9$ | • 97.6 | — | — | ( • 82.4 ) | • |
| 6 | Br | H | 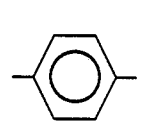 | $C_7H_{15}$ | • 69.0 | ( • 51.5 ) | — | • 91.2 | • |
| 7 | Br | H | 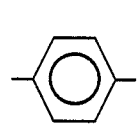 | $C_8H_{17}$ | • 57.5 | • 59.0 | — | • 86.5 | • |
| 8 | Br | H | 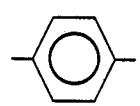 | $C_{10}H_{21}$ | • 52.5 | • 66.8 | — | • 84.6 | • |
| 2 | Br | H | 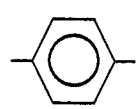 | $C_5H_{11}O$ | • 85.2 | — | — | • 121.6 | • |

TABLE 1-continued
| Example | X | Y | A | Z | C | SC* | SA | Ch | I |
|---|---|---|---|---|---|---|---|---|---|
| 3 | Br | H | 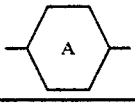 | C$_7$H$_{15}$O | ● 82.3 | (● 78.4 ) | — | ● 126.6 | ● |
| 1 | Br | H | 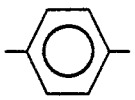 | C$_8$H$_{17}$O | ● 58.0 | ● 94.9 | — | ● 124.5 | ● |
| 4 | Br | H | 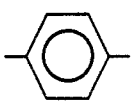 | C$_{12}$H$_{25}$O | ● 59.0 | ● 105.3 | — | ● 116.4 | ● |
| 9 | Br | H | 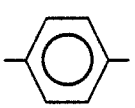 | C$_7$H$_{15}$COO | ● 49.0 | ● 99.2 | — | ● 130.2 | ● |
| 10 | Br | H | 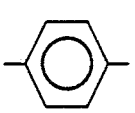 | C$_8$H$_{17}$OCO | ● 75.2 | ● 76.4 | — | ● 79.7 | ● |
| 12 | Br | H | 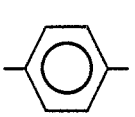 | C$_7$H$_{15}$OCOO | ● 47.1 | ● 72.0 | — | ● 120.3 | ● |
| 11 | Br | H | 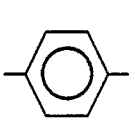 | C$_8$H$_{17}$OCOO | ● 56.2 | ● 80.4 | — | ● 118.1 | ● |
| 13 | Br | H | 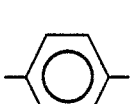 | C$_9$H$_{19}$OCOO | ● 48.5 | ● 87.9 | — | ● 114.0 | ● |
| 14 | Br | H | 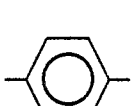 | C$_8$H$_{17}$ | ● 45.6 | — | ● 111.3 | ● 112.2 | ● |
| 15 | CN | H | 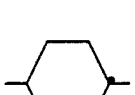 | C$_8$H$_{17}$ | ● 61.8 | — | ● 99.1 | — | ● |
| 16 | CN | H | 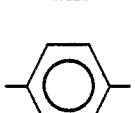 | C$_8$H$_{17}$O | ● 72.1 | (● 60.9 ) | ● 131.6 | — | ● |
| 17 | CN | H | 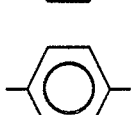 | C$_7$H$_{15}$COO | ● 80.1 | ● 98.0 | ● 142.7 | — | ● |

TABLE 1-continued in Formula (I)*[1]

| Example | X | Y | A | Z | C | Phase transition point (°C.)*[2] SC* | SA | Ch | I |
|---|---|---|---|---|---|---|---|---|---|
| 18 | CN | H | (phenyl) | $C_8H_{17}OCO$ | ● 102.3 | — | ● 122.1 | — | ● |
| 19 | CN | H | (phenyl) | $C_7H_{15}OCOO$ | ● 72.8 | ● 89.7 | ● 127.2 | — | ● |
| 20 | CN | H | (phenyl) | $C_8H_{17}OCOO$ | ● 72.3 | ● 92.1 | ● 130.0 | — | ● |
| 21 | CN | H | (phenyl) | $C_9H_{19}OCOO$ | ● 68.6 | ● 83.3 | ● 122.9 | — | ● |
| 22 | CN | H | (cyclohexyl) | $C_8H_{17}$ | ● 39.2 | — | — | — | ● |
| 23 | H | Br | (phenyl) | $C_8H_{17}$ | ● 38.0 | — | — | ● 62.0 | ● |
| 24 | H | Br | (phenyl) | $C_8H_{17}O$ | ● 63.2 | — | — | ● 104.0 | ● |
| 25 | H | Br | (phenyl) | $C_8H_{17}COO$ | ● 93.2 | — | — | ● 111.8 | ● |
| 26 | H | Br | (phenyl) | $C_8H_{17}OCO$ | ● 36.0 | — | — | ● 50.1 | ● |
| 27 | H | Br | (phenyl) | $C_8H_{17}OCOO$ | ● 69.4 | — | — | ● 111.5 | ● |
| 28 | H | Br | (cyclohexyl) | $C_8H_{17}$ | ● 72.7 | — | — | ● 107.7 | ● |

*[1] Any of $R_1$*'s represents 2-methybutyl group.
*[2] C represents crystalline phase and I represents isotropic liquid phase (clearing phase). The symbol ● in the columns of the respective phases and the numeral figures on the right side thereof represent the phase transition point from the phase to a phase having the symbol ● on the right side thereof, and the symbol — shows that the phase is not exhibited. Further, the numeral figures in the symbol ( ) each represent monotropic phase transition point and also represent the phase transition point from a phase on the right side to the phase.

EXAMPLES 2~8

Other p-alkyloxybenzoyl chlorides having different alkyl chain lengths were reacted in place of p-octyloxybenzoyl chloride in Example 1, (vi) to obtain 3'-bromo-4'-(2-methylbutyloxy)-4-biphenylyl-4-alkyloxybenzoates shown in Table 1. Further, p-alkylbenzoyl chlorides having different alkyl chain lengths were reacted in place of p-octyloxybenzoyl chloride in Example 1, (vi) to obtain 3'-bromo-4'-(2-methylbutyloxy)-4-biphenylyl-4-alkylbenzoates. The phase transition points of these compounds are shown in Table 1.

EXAMPLE 9

Preparation of 3'-bromo-4'-(2-methylbutyloxy)-4-biphenylyl-4-octanoyloxybenzoate (a compound of the formula (I) wherein $R_1^*$ represents the 2-methylbutyl group; Z is the octanoyloxy group;

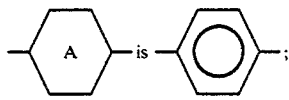

X is Br; and Y is H)

Commercially available p-hydroxybenzaldehyde (50 g) was dissolved in pyridine (400 ml), followed by dropwise adding octanoyl chloride (80 g) under ice cooling, allowing the mixture to stand overnight, adding toluene (300 ml) and 6N hydrochloric acid, separating the solution, further washing with an aqueous solution of 2N NaOH, washing with water, drying and distilling off toluene to obtain a raw product, which was then distilled under reduced pressure to obtain p-octanoyloxybenzaldehyde (b.p. 174°~7° C./7 mmHg) (58.2 g). This product was dissolved in acetic acid (80 ml), followed by dropwise adding to the solution, a mixed solution of chromium trioxide (23.4 g), water (25 ml) and acetic acid (48 ml), stirring at room temperature for 4 hours, pouring on ice, separating solids by filtering, dissolving them in ethanol (300 ml), adding active carbon, shaking, filtering on heating, ice cooling, filtering crystals and recrystallizing from ethanol (300 ml) to obtain p-octanoyloxybenzoic acid (35 g). M.P.: 151° C. This product (5 g) and oxalic acid chloride (7.2 g) were heated on a water bath at 60° C., followed by allowing the reaction mixture to stand overnight, and distilling off excess oxalic acid chloride in vacuo to obtain p-octanoyloxybenzoyl chloride (5 g). This product was used in the following step without purification.

(ii) Preparation of the captioned compound p-Octanoyloxybenzoyl chloride prepared in the above step (i) was reacted in place of p-octyloxybenzoyl chloride in Example 1, (vi) to obtain the captioned compound. Its phase transition points are shown in Table 1.

EXAMPLE 10

Preparation of 3'-bromo-4'-(2-methylbutyloxy)-4-biphenylyl-4-octyloxycarbonylbenzoate (a compound of the formula (I) wherein $R_1^*$ represents the 2-methylbutyl group; Z is octyloxycarbonyl group;

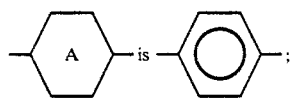

X is Br; and Y is H)

(i) Preparation of p-octyloxycarbonylbenzoyl chloride

Thionyl chloride (300 ml) was added to a mixed solution of commercially available terephthalaldehydic acid (350 g), toluene (700 ml) and pyridine (2 ml), followed by stirring at room temperature, thereafter heating the mixture on a water bath at 60° C. with stirring, further heating to 110° C. on a mantle heater, cautiously adding thionyl chloride (100 ml), heating at 150° C. for 3 hours with stirring, distilling off excess thionyl chloride under reduced pressure and distilling the residue under reduced pressure to obtain terephthalaldehydic acid chloride (328 g) (b.p. 133°~134° C./14 mmHg).

Next, a solution of the above terephthalaldehydic acid chloride (20 g) dissolved in toluene (100 ml) was dropwise added to a solution of 1-octanol (20 g) dissolved in pyridine (150 ml), followed by heating the mixture on a water bath at 60° C. with stirring, allowing to stand overnight, thereafter adding toluene (500 ml), adding 6N hydrochloric acid, separating the liquid layer, washing with an aqueous solution of 2N NaOH, washing with water, drying, distilling off toluene, and further distilling under reduced pressure to obtain p-octyloxycarbonylbenzaldehyde (166°~167° C./4 mmHg) (22 g).

To a solution of this product (20 g) dissolved in acetic acid (200 ml) was dropwise added a mixed solution of chromium trioxide (10 g), water (12 ml) and acetic acid (24 ml), under ice cooling, followed by stirring at room temperature overnight, pouring the reaction mixture on ice, separating solids by filtering, dissolving them in ethanol (200 ml), adding active carbon, shaking, filtering on heating, ice-cooling, filtering crystals, and further recrystallizing from ethanol (200 ml) to obtain p-octyloxycarbonylbenzoic acid (m.p. 113° C.) (11 g).

This product (5 g) and oxalic acid chloride (6.8 g) were heated on a water bath at 60° C., followed by allowing the reaction mixture to stand overnight, and distilling off excess oxalic acid chloride in vacuo, to obtain p-octyloxycarbonylbenzoyl chloride (5 g). This product was used in the following step without purification.

(ii) Preparation of the captioned compound p-Octyloxycarbonylbenzoyl chloride prepared in the above Step (i) was reacted in place of p-octyloxybenzoyl chloride in Example 1, (vi) to obtain the captioned compound. Its phase transition points are shown in Table 1.

EXAMPLE 11

Preparation of 3'-bromo-4'-(2-methylbutyloxy)-4-biphenylyl-4-octyloxycarbonyloxybenzoate (a compound of the formula (I) wherein $R_1^*$ represents the 2-methylbutyl group; Z is the octyloxycarbonyloxy group;

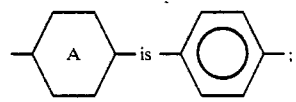

X, Br; and Y is H)

(i) Preparation of p-octyloxycarbonyloxybenzoyl chloride

Commercially available p-hydroxybenzaldehyde (50 g) was dissolved in pyridine (400 ml), followed by dropwise adding octyl chloroformate (85 g) under ice cooling, heating on a water bath, allowing the reaction mixture to stand overnight, adding toluene (300 ml) and 6N hydrochloric acid, separating the liquid layer, further washing with an aqueous solution of 2N NaOH, washing with water, drying and distilling off toluene to obtain a raw product of p-octyloxycarbonyloxybenzaldehyde (75 g).

To a solution of this product in acetic acid (100 ml) was dropwise added a mixed solution of chromium trioxide (30 g), water (40 ml) and acetic acid (60 ml), followed by stirring at room temperature for 4 hours, pouring on ice, separating the resulting solids by filtering, dissolving them in ethanol (400 ml), adding active carbon, shaking, filtering on heating, ice-cooling, separating crystals by filtering, and further recrystallizing from ethanol (300 ml) to obtain p-octyloxycarbonyloxybenzoic acid (41 g). M.P.: 125.5° C.

This product (5 g) and thionyl chloride (7 g) were heated on a water bath at 60° C., followed by allowing to stand overnight, and thereafter distilling off excess thionyl chloride under reduced pressure to obtain p-octyloxycarbonyloxybenzoyl chloride (5 g). This product was used in the following step without purification.

(ii) Preparation of the captioned compound p-Octyloxycarbonyloxybenzoyl chloride prepared in the above step (i) was reacted in place of p-octyloxybenzoyl chloride in Example 1, (vi) to obtain the captioned compound. Its phase transition points are shown in Table 1.

EXAMPLES 12 AND 13 p-Alkyloxycarbonyloxybenzoyl chlorides having different alkyl chain lengths were prepared as in Example 11, and from these were obtained 3'-bromo-4'-(2-methylbutyloxy)-4-biphenylyl-4-alkyloxycarbonyloxybenzoates. Their phase transition points are shown in Table 1.

EXAMPLE 14

Preparation of 3'-bromo-4'-(2-methylbutyloxy)-4-biphenylyl-4-octyl-trans-cyclohexylcarbonate (a compound of the formula (I) wherein $R_1^*$ represents the 2-methylbutyl group; Z is octyl group;

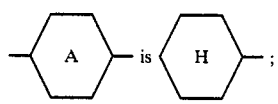

X is Br; and Y is H)

p-Octyl-trans-cyclohexylcarbonyl chloride was reacted in place of p-octyloxybenzoyl chloride in Example 1, (vi) to obtain the captioned compound. Its phase transition points are shown in Table 1.

EXAMPLE 15

Preparation of 3'-cyano-4'-(2-methylbutyloxy)-4-biphenylyl-4-octylbenzoate (a compound of the formula (I) wherein $R_1^*$ represents the 2-methylbutyl group; Z is the octyl group;

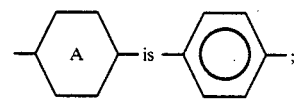

X is CN; and Y is H)

(i) Preparation of 3'-cyano-4'-(2-methylbutyloxy)-4-hydroxybiphenyl

A mixture of 3'-bromo-4'-(2-methylbutyloxy)-4-biphenylylbenzoate (17 g) prepared in Example 1, (iv), cuprous cyanide (4.3 g) and N-methyl-2-pyrrolidone (200 ml) was first heated to 200° C. during which low boiling substances up to 200° C. were distilled off, and then heated under reflux at 200°~205° C. for 4 hours, followed by cooling down to room temperature, dropwise adding a mixed solution of ethylenediamine (50 ml) and water (200 ml), heating at 60° C. for 2 hours with stirring, allowing to stand overnight, separating the resulting deposited solids by filtering and further recrystallizing from ethanol to obtain 3'-cyano-4'-(2-methylbutyloxy)-4-hydroxybiphenyl (6.4 g). M.P.: 181.4° C. Its structure was confirmed according to NMR and IR.

(ii) Preparation of the captioned compound, 3'-cyano-4'-(2-methylbutyloxy)-4-biphenylyl-4-octylbenzoate 3'-Cyano-4'-(2-methylbutyloxy)-4-hydroxybiphenyl (0.5 g) obtained in the above (i) was dissolved in pyridine (20 ml), followed by dropwise adding p-octylbenzoyl chloride (0.4 g) under ice cooling, allowing the mixture to stand on a water bath overnight, thereafter adding toluene (80 ml), washing with 6N hydrochloric acid, washing with water, further washing with an aqueous solution of 2N NaOH, washing with water to make the solution neutral, drying, distilling off toluene, and twice recrystallizing from ethanol (50 ml) to obtain 3'-cyano-4'-(2-methylbutyloxy)-4-biphenylyl-4-octylbenzoate (0.5 g). Its phase transition points are shown in Table 1.

EXAMPLES 16~22

In Example 15, (ii), various 4-substituted benzoic acid chlorides or p-alkylcyclohexanecarboxylic acid chlorides were reacted in place of p-octylbenzoyl chloride to obtain compounds shown in Table 1, Examples 16~22. Their phase transition points are shown in Table 1.

EXAMPLE 23

Preparation of 4'-(2-methylbutyloxy)-3-bromo-4-biphenylyl-4-octylbenzoate (a compound of the formula (I) wherein $R_1^*$ represents the 2-methylbutyl group; Z is the octyl group;

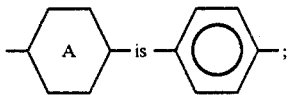

X is H; and Y is Br)

(i) Preparation of 4'-(2-methylbutyloxy)-3-bromo-4-hydroxybiphenyl

4'-(2-Methylbutyloxy)-4-hydroxybiphenyl (15 g) obtained in Example 1, (i) was dissolved in 1,4-dioxane (50 ml), followed by dropwise adding a mixture of bromine (10.5 g) and 1,4-dioxane (140 ml), heating on a water bath at 40° C. for 4 hours with stirring, thereafter distilling off 1,4-dioxane under reduced pressure, adding toluene (300 ml) to the remaining solution, adding a 10% aqueous solution of sodium hydrogen sulfite till the color of bromine disappeared, three times washing with saturated aqueous solution of NaCl to make the liquid neutral, drying and distilling off toluene to obtain a raw product of 4'-(2-methylbutyloxy)-3-bromo-4-hydroxybiphenyl (21 g).

In a solution of this product (20 g) in pyridine (200 ml) was poured benzoyl chloride (13.2 g), followed by heating on a water bath, allowing to stand overnight, adding toluene (300 ml), further adding 6N hydrochloric acid, separating the liquid layer, washing with an aqueous solution of 2N NaOH, washing with water, drying and distilling off toluene to obtain a raw product of 4'-(2-methylbutyloxy)-3-bromo-4-biphenylylbenzoate (25.2 g), which was recrystallized from ethanol (200 ml) and further recrystallized from ethanol (180 ml) to obtain 4'-(2-methylbutyloxy)-3-bromo-4-biphenylylbenzoate (m.p. 83.0° C.) (15 g).

To this product (5 g) were added a 40% aqueous solution (2 g) of NaOH and ethanol (100 ml), followed by heating under reflux for 2 hours, distilling off ethanol, adding toluene (100 ml) and 6N hydrochloric acid, dissolving the solids washing with a saturated aqueous solution of sodium hydrogen carbonate, washing with water, drying, distilling off toluene and recrystallizing from a mixed solvent of toluene-heptane to obtain 4'-(2-methylbutyloxy)-3-bromo-4-hydroxybiphenyl (m.p. 49.4° C.) (3.2 g).

(ii) Preparation of the captioned compound

4'-(2-Methylbutyloxy)-3-bromo-4-hydroxybiphenyl (0.25 g) was dissolved in pyridine (10 ml), followed by dropwise adding p-octylbenzoyl chloride (0.20 g) under ice cooling, heating on a water bath at 60° C., allowing to stand overnight, adding toluene (50 ml), adding 6N hydrochloric acid, separating the liquid layer, washing with an aqueous solution of 2N NaOH, washing with water, drying, distilling off toluene, dissolving the residue in ethanol (30 ml), filtering on heating, and further recrystallizing from ethanol (30 ml) to obtain the captioned compound. Its phase transition points are show in Table 1.

EXAMPLES 24~28

In Example 23, (ii), various 4-substituted benzoic acid chlorides or p-alkyl-trans-cyclohexanecarboxylic acid chlorides were reacted in place of p-octylbenzoyl chloride to obtain compounds of Table 1, Examples 24~28. Their phase transition points are shown in Table 1.

EXAMPLE 29

Preparation of 4'-(1-methylheptyloxy)-3'-fluoro-4-biphenylyl 4-butylbenzoate (a compound of the formula (I) wherein $R_1^*$ represents the 1-methylheptyl group; Z is butyl group;

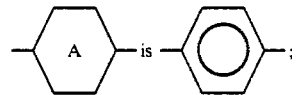

X is F; and Y is H)

(i) Preparation of 3-fluoro-4-methoxy-biphenyl o-Fluoro-p-bromoanisole, b.p. 65°~66° C. (4.5 mmHg), prepared by usual methylation of known o-fluoro-p-bromophenol, b.p. 61° C. (3.0 mmHg) was converted to m-fluoro-p-anisylmagnesium bromide in ethyl ether. The resulting Grignard reagent (1 mol) was cooled and thereto was dropwise added cyclohexanone (one mol) below 7° C., and the mixture stirred for ½ hr at room temperature, acidified with dilute hydrochloric acid and heated with stirring under reflux for 1 hr. The organic layer was separated, washed with water, and the ether was removed to dryness. The residue was recrystallized from ethanol (600 ml) to obtain colorless crystals (96 g), m.p. 49°~50° C. This product was found to be m-fluoro-p-anisylcyclohexene-1, not the cyclohexanol-1.

This cyclohexene-1 (0.46 mol) was aromatized by heating with chloranil (0.97 mol) in xylene (700 ml) under reflux for 4 hours. Tetrachlorohydroquinone was removed by filtration, the filtrate washed with 1N aqueous sodium hydroxide, and the solvent stripped by vacuum evaporation. The residual solids, after passing through a chromatographic column of alumina in toluene solution, was recovered in the usual way, and twice recrystallized from ethanol to yield 3-fluoro-4-methoxy-biphenyl (60 g), m.p. 84.5°~86° C.

(ii) Preparation of 3'-fluoro-4'-hydroxy-4-acetylbiphenyl

3-Fluoro-4-methoxybiphenyl was acetylated with acetyl chloride/AlCl$_3$ in carbon disulfide in the usual way. The product was twice recrystallized from toluene to obtain 3'-fluoro-4'-methoxy-4-acetylbiphenyl (yield: 82%), m.p. 149°~149.5° C.

Forty grams of this product was heated with 180 g of concentrated hydrobromic acid and 450 ml of acetic acid for 32 hrs. under reflux to obtain 35 g of 3'-fluoro-4'-hydroxy-4-acetylbiphenyl, m.p. 154.7°~158.5° C.

(iii) Preparation of 3'-fluoro-4'-(1-methylheptyloxy)-4-acetylbiphenyl

3'-Fluoro-4'-hydroxy-4-acetylbiphenyl (15 g), potassium hydroxide (4.0 g), ethanol (370 ml), optically active 1-methylheptyl p-toluenesulfonate (20.5 g), were heated for 5 hrs. under reflux, to obtain by usual workup, 6.37 g of 3'-fluoro-4'-(1-methylheptyloxy)-4-acetyl-biphenyl, m.p. 67.6°~68.5° C.

(iv) Preparation of 3'-fluoro-4'-(1-methylheptyloxy)-4-hydroxybiphenyl

The above acetyl compound, dissolved in 300 g of 90% formic acid was treated with 18.1 g of 35% $H_2O_2$ at 50° C. for 5 hrs. Excess peroxide was decomposed with sodium hydrogen sulfite, and the product was taken up in aqueous toluene. The toluene was removed by vacuum evaporation, and the residue, hydrolyzed by heating with 10% aqueous sodium hydroxide (70 ml), and 45 ml ethanol under reflux for 2 hrs., to obtain 5.3 g of 3'-fluoro-4'-(1-methylheptyloxy)-4-hydroxybiphenyl, m.p. 65.2°~66.7° C.

(v) Preparation of the captioned compound

Esterification of the above phenol with p-butylbenzoyl chloride was carried out in the usual way, and the product was recrystallized from ethanol; C-Ch, 46.6° C.; Ch-I, 60.9° C.

Compounds of Example 30 to 38 were prepared in the similar way and the phase transition temperatures are listed in Table 2.

TABLE 2

In formula (I)*1

| Example | X | Y | A | Z | C | Phase transition point (°C.)*2 SC* | SA | Ch | I |
|---------|---|---|---|---|---|---|---|---|---|
| 29 | F | H | ⌬ | $C_4H_9$ | ● 46.6 | — | — | ● 60.9 | ● |
| 30 | F | H | ⌬ | $C_6H_{13}$ | ● 48.4 | — | ● 59.4 | ● 69.6 | ● |
| 31 | F | H | ⌬ | $C_7H_{15}$ | ● 45.5 | — | ● 78.9 | ● 79.8 | ● |
| 32 | F | H | ⌬ | $C_8H_{17}$ | ● 48.0 | — | ● 78.6 | ● 79.2 | ● |
| 33 | F | H | ⌬ | $C_{10}H_{21}$ | ● 46.5 | ● 59.0 | ● 83.9 | — | ● |
| 34 | F | H | ⌬ | $-OC_6H_{13}$ | ● 62.3 | — | ● 114.7 | ● 115.0 | ● |
| 35 | F | H | ⌬ | $-OC_7H_{15}$ | ● 60.5 | ● 58.0 | ● 112.8 | — | ● |
| 36 | F | H | ⌬ | $-OC_8H_{17}$ | ● 67.0 | ● 65.1 | ● 117.1 | — | ● |
| 37 | F | H | ⌬ | $-OC_9H_{19}$ | ● 56.4 | ● 93.2 | ● 115.0 | — | ● |

TABLE 2-continued

| | In formula (I)*[1] | | | | | Phase transition point (°C.)*[2] | | | |
|---|---|---|---|---|---|---|---|---|---|
| Example | X | Y | A | Z | C | SC* | SA | Ch | I |
| 38 | F | H | (phenyl-phenyl) | —OC$_{11}$H$_{23}$ | • 59.5 | • 100.1 | • 112.2 | — | • |

*[1] Any of R$_1$*'s represents 1-methylheptyl group.
*[2] Same as the description of Table 1.

EXAMPLE 39 (USE EXAMPLE 1)

A nematic liquid crystal composition consisting of
4-ethyl-4'-cyanobiphenyl: 20% by weight,
4-pentyl-4'-cyanophenyl: 40% by weight,
4-octyloxy-4'-cyanobiphenyl: 25% by weight and
4-pentyl-4'-cyanoterphenyl: 15% by weight,
was filled in a cell consisting of transparent electrodes which were coated with polyvinyl alcohol (PVA) as an agent for aligning treatment and whose surfaces were subjected to aligning treatment by rubbing (distance between electrodes: 10 μm), to prepare a TN type display cell, which was observed under a polarization microscope. As a result, formation of a reverse domain was observed.

A TN cell was similarly prepared using a mixture obtained by adding to the above nematic liquid crystal composition, the compound of Example 15 of the present invention in an amount of 1% by weight, and observed. As a result, the reverse domain was dissolved and a uniform nematic phase was observed.

EXAMPLE 40 (USE EXAMPLE 2)

The compounds of Examples 7, 8, 12 and 13 of the present invention were mixed together all in equal amounts. The mixture exhibits SC* phase up to 71° C., Ch phase at temperatures exceeding it; and an isotropic liquid at 101° C.

This mixture was filled in a cell provided with transparent electrodes coated with PVA and subjected to a parallel aligning treatment by surface rubbing, and slowly cooled starting from an isotropic liquid domain to SC* phase while a direct current voltage of 50 V was impressed, to obtain a uniform monodomain cell. This liquid crystal cell was placed between two polarizers arranged in a crossed Nicol state, and a low frequency alternating current of 0.5 Hz and 15 V was impressed. As a result, a clear switching operation was observed, and there was obtained a liquid crystal display element giving a very good contrast and high response rate (2 m sec).

In addition, the liquid crystal composition had a value of spontaneous polarization (Ps) of 3.0 nC/cm$^2$.

EXAMPLE 41 (USE EXAMPLE 3)

The compounds of Examples 1, 4, 10 and 11 of the present invention were mixed together all in equal amounts. The mixture exhibits SC* phase up to 89° C., Ch phase at temperatures exceeding it and an isotropic liquid at 110° C.

To the mixture was added 3% by weight of D-16 (a product made by BDH company) as an anthraquinone dyestuff to prepare a display element of the so-called guest-host type, which was filled in the same cell as in Example 30, and one polarizer was arranged so that the polarization plane might be perpendicular to the axis of molecule. When a low frequency alternating current of 0.5 Hz and 15 V was applied to the cell, a clear switching operation was observed and there was obtained a liquid crystal display element giving a very good contrast and a high response rate (2 m sec).

In addition, the liquid crystal composition had a value of spontaneous polarization of 2.5 nC/cm$^2$.

What we claim is:

1. A substituted biphenyl ester expressed by the general formula

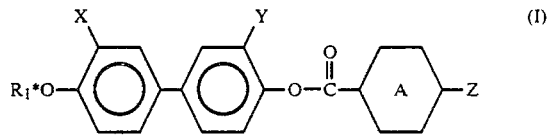

wherein R$_1$* represents an optically active alkyl group of 4 to 18 carbon atoms;

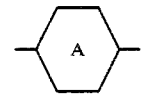

represents

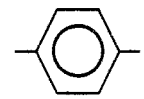

or

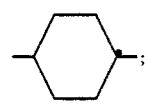

Z represents R$_2$, R$_2$CO or R$_2$COO wherein R$_2$ represents an alkyl group or an alkoxy group each of 4 to 12 carbon atoms; and X and Y each represent hydrogen, bromine, chlorine, fluorine or cyano, and either one of X or Y is always hydrogen, with the provisos that (1) X and Y are not both hydrogen, and (2) when

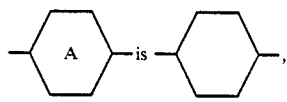,

Z is alkyl of 4 to 12 carbon atoms.

2. A compound according to claim 1 wherein $R_1^*$ in the general formula (I) represents the 2-methylbutyl group.

3. A compound accoridng to claim 1 wherein X represents Br and Y represents H in the general formula (I).

4. A compound according to claim 1 wherein X represents CN and Y represents H in the general formula (I).

5. A compound according to claim 1 wherein X represents H and Y represents Br in the general formula (I).

6. A chiral smectic liquid crystal composition comprising a mixture of compounds at least one of which is a compound as set forth in claim 1.

7. A chiral smectic liquid crystal composition consisting of a plurality of compounds as set forth in claim 1.

8. In a light-switching element containing a chiral smectic liquid crystal composition, the improvement wherein the composition is chiral smectic liquid crystal composition as set forth in claim 6.

* * * * *